INVENTORS
TAKASHI SUZUKI
TAKESHI HAMABE

United States Patent Office 3,598,705
Patented Aug. 10, 1971

3,598,705
METHOD OF TREATING THE SURFACE OF ALUMINUM AND ALUMINUM ALLOYS, AND INSULATION COATED CONDUCTORS OBTAINED THEREBY
Takashi Suzuki and Takeshi Hamabe, Toyonaka-shi, Japan, assignors to Matsushita Electric Co., Ltd., Osaka, Japan
Filed Nov. 18, 1968, Ser. No. 776,559
Int. Cl. C23b 5/48, 9/02
U.S. Cl. 204—27                    1 Claim

ABSTRACT OF THE DISCLOSURE

A method of treating the surface of aluminum and aluminum alloys, wherein in forming an oxide coating on said surface by anodic oxidation the thickness of the coating is reduced locally at the positions spaced closely along the length of the substrate thereby to obtain an electric insulation coating of great flexural strength, and insulation coated conductor produced thereby.

---

Figure 1:
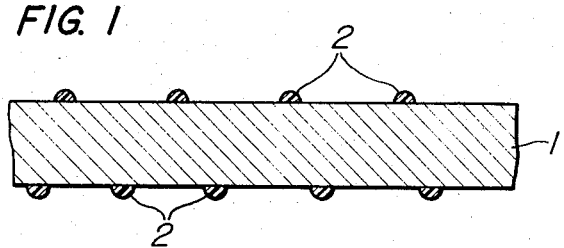

The present invention relates to a method of treating the surfaces of aluminum and its alloys for forming thereon an electric insulation coating of great flexural strength, and also to the insulation coated conductors obtained thereby.

An oxide film obtained by anodic oxidation using aluminum or aluminum alloy provides excellent electric insulation and is, therefore, used as a surface insulating material for wire- or strip-shaped conductors (hereinafter referred to as conductors) of aluminum and aluminum alloys. However, anodic oxide coatings obtained by conventional anodic oxidation methods are little flexible and liable to crack even on stretching at an elongation percentage of only 0.4 to 0.5%. Namely, when a conductor having an anodic oxide coating thereon is bent at a radius of curvature shorter than a certain value, cracks occur in the coating in a direction perpendicular to the bending direction due to a tension developed in said coating. The gap of these cracks becomes greater as the tension is increased upon further reducing the radius of curvature at which the conductor is bent. Such increase in the gap of cracks results in degradation of the insulation ability of the coating. For this reason, the conductors having an oxide coating formed thereon by the conventional anodic oxidation methods had the drawback that they are substantially unusable under the condition wherein they are bent at a radius of curvature shorter than about 20 times the diameter or the thickness of the conductors, because the insulation ability of the coating is unserviceably degraded under such condition, while the coating has excellent heat resisting and bonding properties. It is possible that the flexural strength of the coating may be improved by increasing the number or the density of cracks occurring in the coating upon bending and thereby reducing the gap of the cracks. The present invention has been achieved based on this idea and provides a method by which said idea can be materialized.

The present invention, therefore, is concerned with a surface treating method which comprises applying electric insulating material on the surface of an aluminum or aluminum alloy substrate at close intervals and thereafter subjecting said aluminum or aluminum alloy substrate to anodic oxidation thereby to form an oxide coating of locally varying thickness.

The present invention is further concerned with an insulation coated conductor which comprises a wire-shaped or strip-shaped, elongate aluminum or aluminum alloy substrate and an oxide coating formed on the surface thereof by anodic oxidation, said oxide coating including portions where the thickness is reduced locally, the density of said reduced thickness portions being 20 to 100 per 1 mm. of the length of said elongate substrate and the thickness reduction percentage of the coating at each of said reduced thickness portions being from 5 to 50%.

Figure 2:
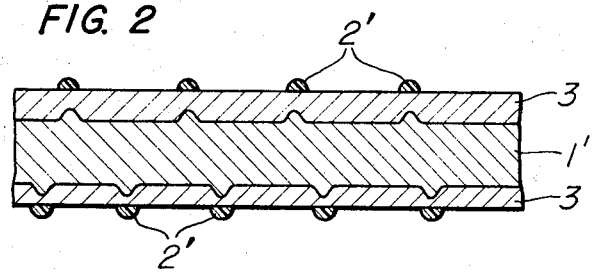

In order that the present invention may be more clearly understood, reference may now be made to the accompanying drawings in which the present invention is illustrated by way of embodiment and in which:

FIG. 1 is a diagrammatic view showing a portion of the longitudinal section of an aluminum strip or aluminum wire with electric insulating material applied on the surface or surfaces thereof at close intervals, wherein reference numeral 1 designates the aluminum strip or aluminum wire and 2 designates the electric insulating material; and FIG. 2 is a diagrammatic view, similar to FIG. 1, showing a portion of the longitudinal section of the aluminum strip or aluminum wire after having been subjected to anodic oxidation, wherein reference numeral 3 designates an anodic oxide coating, 1' the aluminum wire and 2' the electric insulating material.

With electric insulating material applied on the surface of a conductor, anodic oxidation takes place first at those portions of the surface where no electric insulating material is present, forming an oxide coating thereat. As the anodic oxidation proceeds, the coating grows gradually and at the periphery of the electric insulating material adhered to the substrate the coating propagates not only in a vertical direction into the substrate conductor but also in a horizontal direction beneath the electric insulating material, and finally the coating is formed over the entire surface of the substrate conductor. In this case, since the growth of the coating depends on the flow of a current from an electrolyte to the substrate conductor, the coating grows relatively slowly at the portions of the substrate conductor underlying the particulate electrical insulating material, and accordingly the thickness of the coating (hereinafter referred to as coating thickness) in a direction perpendicular to the surface of the substrate conductor becomes smaller at the portions beneath the electric insulating material than at the other portions. When the conductor having the coating formed thereon in the manner described is bent, cracks occur at the portions where the coating thickness is reduced, that is, the portions where the electric insulating material is attached, or at the boundary between said portions and the other portions. In order to improve the flexural strength, or in other words, the crack density upon bending, of the oxide film coated conductor, it is only necessary to increase the density of the electric insulating material applied portions while reducing the size of said material.

As the electric insulating material, natural and synthetic resin powders and glass powders, which are molten upon heating, liquid synthetic resins and electric insulating paints may be used. Any electric insulating material which is to be used must be adhesive to the conductor to be coated and must not be deteriorated by the electrolyte in the process of anodic oxidation. Further, the electric insulating material must be applied at uniform intervals on the entire surface of the substrate conductor. When the electric insulating material is powdery in state, this may be attained, for example, by a method wherein the powder is sprayed over the surface of a previously heated substrate conductor through a spray nozzle, by a method wherein the powder is electrostatically attached to the surface of the substrate conductor and then fused with heat, by the fluidized bed coating process, or by a method wherein the powder is attached to the substrate conductor by electrophoresis in a liquid wherein said powder is dispersed and then fused with heat.

Where the electric insulating material is liquid in state, various printing methods, such as the photogravure printing method and relief printing method, may be employed. The photoresist method which is used in the art of semiconductors, may also be employed as a special method.

The anodic oxidation is carried out in an aqueous solution of sulfuric acid, oxalic acid or chromic acid, in the manner well-known in the art.

The electric insulating material is preferably applied on the surface of the substrate conductor in a manner such that said material is distributed in the form of dots or lines, or in the shape of a screen. The size of the dotted particles, the thickness of the lines or the thickness of the lines constituting the screen is preferably smaller than three times the thickness of the coating to be formed, most preferably from 1 to ⅛ time the coating thickness.

If necessary, the electric insulating material may be removed, after the anodic oxidation, by dissolving it with a solvent or by burning it with a flame.

Where the electric insulating material used has the property of being fused by heat, even after the formation of the oxide coating, the coated conductor is wound into the shape of a coil as such and then the resultant coil is heated, whereby the turns of the conductor are securely bonded with each other by means of said electric insulating material.

The oxide coating, when used for the insulation of a conductor, is usually formed in a thickness of form 5 to $20\mu$. If, in this case, the number of cracks, formed in the oxide coating upon bending, is from 20 to 100 in a longitudinal length of 1 mm., a solenoid of the ordinary shape can be formed. Thus, it will be understood that a conductor which is usable for the formation of the solenoid, requires only in every 1 mm. of the length thereof from 20 to 100 coating thickness reduced portions (electric insulting material attached portions) where cracks tend to occur. The thickness reduction percentage at the coating thickness reduced portions is preferably from 5 to 50% of the coating thickness at the other portions.

EXAMPLE 1

A powder of epoxy-type paint for fluidized bed coating (the average particle size being $5.5\mu$) was sprayed on the surfaces of an aluminum foil having a thickness of 0.1 mm. and a purity of 99.4%, using a spray gun and then the aluminum foil was vibrated to remove the excess paint attached thereon. Thereafter, the aluminum foil was baked at 220° C. A microscopic observation revealed that the paint particles were present on the surfaces of the aluminum foil at an interval averaging about $10\mu$. Then, the aluminum foil was subjected to anodic oxidation in 10% oxalic acid at 30° C. for about 10 minutes at 40 v. DC, following the foil was washed with water and dried. The cross-section of the sample was observed through a microscope and it was found that the thickness of the coating formed at the portions where the paint is not present was about $7\mu$ and that at the portions where the paint is present was at least from 4 to $6\mu$.

For comparison, another sample was prepared by subjecting the same aluminum foil to anodic oxidation under the same conditions as set out above, without applying the insulating paint thereon.

The two samples thus prepared were bent on an iron rod of 5 mm. in diameter and the number of cracks occurring (the number of cracks present in a length of 1 mm. in a direction at a right angle to the axis of said iron rod and represented by cracks/mm.) was counted for each sample, with the result shown below:

| | Cracks/mm. |
|---|---|
| Sample with the paint applied | 39 |
| Sample with no paint applied | 12 |

Thereafter, the paint on the surface of the other parts of the sample was burnt by a gas burner and the number of cracks was counted again, with no substantial decrease.

The dielectric breakdown voltages of the samples, when bent at a radius of curvature of 2 mm., were as follows:

| | V. AC on average |
|---|---|
| Sample with the paint applied (after removal of paint by burning) | 150 |
| Sample with no paint applied | 65 |

EXAMPLE 2

A silica powder-containing thixotropic epoxy resin (with a curing agent added thereto) was applied on the surfaces of an aluminum foil having a thickness of 0.1 mm. and a purity of 99.4%, by photogravure printing. The resin was cured for 24 hours at room temperature. A microscopic observation revealed that the pattern of the prototype photogravure used was reproduced precisely with least sagging of the resin. Practically, the resin applied on the aluminum foil formed square patterns of a side length of about $10\mu$, arranged at an interval of $8\mu$. The aluminum foil was subjected to an anodic oxidation and tested in the same manner as in Example 1, with the following results:

Number of cracks—about 60

Dielectric breakdown voltage when bent at a radius of curvature of 4 mm.—170 v. AC As will be understood from the foregoing description, the method of this invention enables an electric insulating coating of great flexural strength to be formed on the surfaces of aluminum and aluminum alloys, and is thus of great industrial advantage.

What is claimed is:

1. An insulation coated conductor which comprises a wire-shaped or strip-shaped, elongate aluminum or aluminum alloy substrate and an oxide coating formed on the surface thereof by anodic oxidation, said oxide coating including portions where the thickness is reduced locally, the density of said reduced thickness portions being 20 to 100 per 1 mm. of the length of said elongate substrate and the thickness reduction percentage of the coating at each of said reduced thickness portions being from 5 to 50%.

References Cited

UNITED STATES PATENTS 3,457,148    7/1969    Waggener _____ 204—58X

FREDERICK C. EDMUNDSON, Primary Examiner

U.S. Cl. X.R.

204—58

UNITED STATES PATENT OFFICE
CERTIFICATE OF CORRECTION

Patent No. 3,598,705　　　　　　　　Dated August 10, 1971

Inventor(s) Takashi Suzuki et al.

It is certified that error appears in the above-identified patent and that said Letters Patent are hereby corrected as shown below:

Column 1, line 7: after "Electric" insert --Industrial--.

Signed and sealed this 7th day of March 1972.

(SEAL)
Attest:

EDWARD M. FLETCHER, JR.　　　　　　ROBERT GOTTSCHALK
Attesting Officer　　　　　　　　　Commissioner of Patents FRW:pk　　　October 26, 1971